United States Patent
Aleksic et al.

(10) Patent No.: US 7,770,040 B2
(45) Date of Patent: Aug. 3, 2010

(54) METHOD AND APPARATUS FOR REDUCING POWER CONSUMPTION OF A CO-PROCESSOR BY SWITCHING TO LOW POWER DEDICATED MEMORY IN WHICH IMAGE DATA IS PERIODICALLY UPDATED

(75) Inventors: Milivoje Aleksic, Richmond Hill (CA); Aris Balatsos, Toronto (CA); Charles Leung, North York (CA)

(73) Assignee: QUALCOMM Incorporated, San Diego, CA (US)

( * ) Notice: Subject to any disclaimer, the term of this patent is extended or adjusted under 35 U.S.C. 154(b) by 467 days.

(21) Appl. No.: 11/388,928

(22) Filed: Mar. 24, 2006

(65) Prior Publication Data

US 2007/0226522 A1 Sep. 27, 2007

(51) Int. Cl.
*G06F 1/32* (2006.01)
(52) U.S. Cl. .................. 713/320; 345/545; 345/555
(58) Field of Classification Search ........... 713/320, 713/324; 345/545, 555
See application file for complete search history.

(56) References Cited

U.S. PATENT DOCUMENTS

| | | | |
|---|---|---|---|
| 6,735,141 B2 * | 5/2004 | Ikeda et al. .............. 365/226 |
| 7,102,645 B2 * | 9/2006 | Chow .................... 345/520 |
| 7,245,945 B2 * | 7/2007 | Paver et al. ............. 455/574 |
| 7,389,432 B2 * | 6/2008 | Chandley et al. ......... 713/320 |
| 2004/0150647 A1 * | 8/2004 | Aleksic et al. ........... 345/555 |
| 2004/0199798 A1 * | 10/2004 | Whelan et al. ........... 713/300 |
| 2009/0102850 A1 * | 4/2009 | Liang et al. ............. 345/545 |

* cited by examiner

*Primary Examiner*—Albert Wang
(74) *Attorney, Agent, or Firm*—Timothy F. Loomis; Michael J. DeHaemer

(57) ABSTRACT

To provide reduced power consumption of a co-processor, a low power dedicated memory is provided. During a low power state, a processing component of the co-processor is instructed to use the low power dedicated memory and a first memory device, normally used by the processing component, is thereafter operated in a reduced power mode for the duration of the low power state. Preferably, the low power dedicated memory has a storage capacity that is significantly less than the storage capacity of the first memory. When an operating state other than the low power state is detected, normal power consumption by the first memory is resumed and the co-processor is directed to use the first memory once again. In this manner, the present invention allows co-processors, and preferably graphics co-processors, to operate in a beneficial low power mode thereby reducing power consumption.

28 Claims, 3 Drawing Sheets

METHOD AND APPARATUS FOR REDUCING POWER CONSUMPTION OF A CO-PROCESSOR BY SWITCHING TO LOW POWER DEDICATED MEMORY IN WHICH IMAGE DATA IS PERIODICALLY UPDATED

FIELD OF THE INVENTION

The present invention relates generally to systems comprising a host processor and a co-processor and, in particular, to a method and apparatus for reducing power consumption of co-processors, particularly graphics processors.

BACKGROUND OF THE INVENTION

In a wide variety of computationally-capable devices, such as computers, digital cameras, cellular telephones, printers, etc., it is known for a host processor to execute one or more operations with the assistance of a co-processor. Typically, a co-processor is called upon to execute specialized or processing-intensive functions. For example, if the host processor requires one or more images to be rendered on a display screen, a graphics co-processor may be used to perform the rendering operations.

As further known in the art, co-processors typically include one or more processing components and dedicated memory (typically) used exclusively by the one or more processing components. For example, in the case of a graphics co-processor, it is known to use a dedicated memory for the purpose of establishing a frame buffer. Frame buffers are used as storage for image data to be rendered on a suitable display. With the recent advent of portable devices that incorporate video and/or graphics processing, reduced cost and size for constituent components that support such processing has become increasingly important. For example, in the case of graphics co-processors, the dedicated memory described above has been implementing using so-called embedded dynamic random access memory (EDRAM) which has the advantage of low cost and reduced physical dimensions. However, a drawback of EDRAM, including its significant use of power during normal operation, is the occurrence of substantial quantities of leakage current even when the device is not active. In portable, battery-operated devices, this can have a significant, deleterious impact on battery life.

Although other storage devices are available, such as static random access memory (SRAM), which offer less leakage current and therefore reduce battery drain, such devices are typically more expensive and have larger physical dimensions. Therefore, it would be advantageous to provide a co-processor architecture that provides the benefits of low cost, small physical dimension memory devices but that overcomes the leakage current problems typically associated with such devices.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, the present invention provides a method and apparatus for reducing power consumption of a co-processor. In particular, this is achieved by providing a low power dedicated memory for use by the co-processor. Thus, when operating in a normal power state, processing components within the co-processor uses a first memory that is not optimized for usage during a low power state. However, during a low power state, the processing component is instructed to use the low power dedicated memory and the first memory device is thereafter operated in a reduced power mode for the duration of the low power state. Preferably, the low power dedicated memory comprises SRAM and has a storage capacity that is significantly less than the storage capacity of the first memory. When an operating state other than the low power state is detected, normal power consumption by the first memory is resumed and the co-processor is directed to use the first memory once again.

In an application of the present invention to graphics co-processors, a color depth (i.e., the number of bits used to represent the color of a single pixel in a bitmapped image or video frame buffer) associated with the low power dedicated memory is preferably less than the color depth of the first memory. Further still, when applied to graphics co-processors, the present invention provides for the use, within a display, of a low power active window having reduced dimensions compared to an active window used during normal operation. When a low power active window is employed during a low power state, regions of the display not used for rendering the low power active window may display programmable background colors or may be unused entirely, i.e., black. In this manner, the present invention allows co-processors, and preferably graphics co-processors, to operate in a beneficial low power mode thereby reducing power consumption.

Figure 1:
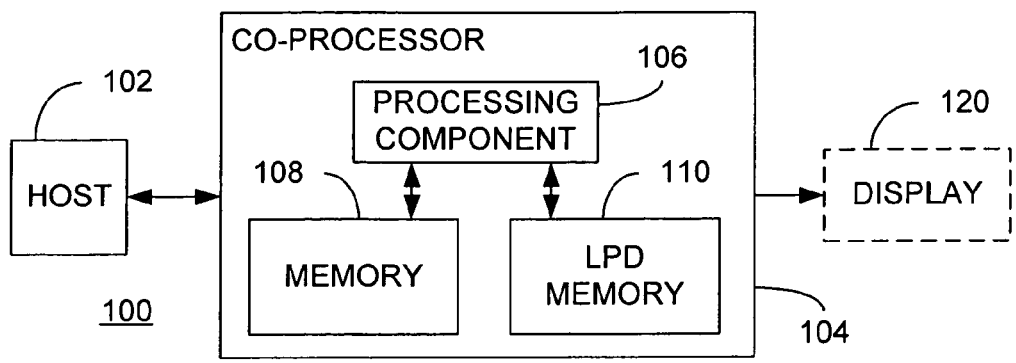
FIG. 1 is a schematic block diagram of a device incorporating a co-processor in accordance with the present invention.

Referring now to FIG. 1, a device 100 generally comprising a host 102 and a co-processor 104 is illustrated. Devices 100 in accordance with the present invention may comprise virtually anything that may incorporate a co-processor such as computers, digital cameras, cellular telephones, printers, etc. Typically, the host processor 102 is responsible for overall operation of the device, including interfacing with and controlling a variety of components (e.g., input/output devices, communication interfaces, etc.) not illustrated in FIG. 1 for simplicity. The host processor 102 may comprise any type of processor such as a microprocessor, microcontroller, digital signal processor, or combinations thereof operating under the control of stored executable instructions.

In a similar vein, the co-processor 104 may comprise any element typically used for offloading processing operations from the host 102. Typically, the co-processor 104 may comprise any one or a combination of such processors, or one or more suitably configured programmable logic arrays such as an application specific integrated circuit (ASIC). Once again, various components typically employed in co-processors are not shown in FIG. 1 for ease of illustration. Those having ordinary skill in the art will appreciate that other configurations of a host processor 102 and co-processor 104 may be equally employed.

As further illustrated, the co-processor 104 comprises one or more processing components 106 (only one shown) in communication with a first memory 110 and a low power dedicated memory 112. Optionally, communication with the first memory 110 and low power dedicated memory 112 may be mediated by a memory controller 108 as known in the art. Generally, the processing component 106 performs operations on data or instructions stored in the first memory 110 or the low power dedicated memory 112 and provides results to other components of the device 100.

Although the present invention is generally applicable to any instance in which it is desirable to operate a co-processor in a low power mode, the present invention may be particularly beneficially applied to graphics co-processors. In this case, the one or more processing components 106 comprises a display engine that, among other things, operates on a frame buffer stored in the first memory 110. As know in the art, a frame buffer is used as storage for image data to be rendered on a suitable display. In particular, the display engine 106 processes a data in the frame buffer (possibly provided by the host processor 102) in order to provide it to a display 120 in communication with the graphics processor 104.

In a presently preferred embodiment, the first memory 110 comprises EDRAM and the low power dedicated memory 112 comprises SRAM, as known in the art. However, those having skill in the art will appreciate that other types of memory devices may be equally employed when implementing the first memory 110 and low power dedicated memory 112. Typically, the first memory is relatively large, on the order of several megabytes of storage. Although the low power dedicated memory 112 may comprise virtually any convenient amount of storage, it is preferred that the amount of storage provided by the low power dedicated memory 112 is significantly less, on the order of several kilobytes of storage. In this manner, the low power dedicated memory 112 may provide support for the one or more processing components 106 without consuming nearly as much power as the first memory. Additionally, this reduced storage capacity results in reduced physical dimensions of the low power dedicated memory 112.

Where the present invention is applied a graphics co-processor, power consumption of the low power dedicated memory 112 may be further reduced by reducing the color depth of the low power dedicated memory 112 in comparison with the first memory 110. As know in the art, color depth indicates the number of bits used to represent the color of a single pixel in a bitmapped image or frame buffer. Thus, a larger color depth supports a larger range of colors, whereas a smaller color depth supports a smaller range of colors. For example, it is not uncommon to employ a color depth of two or three bytes in the first memory 110. In contrast, the color depth of the low power dedicated memory 112 may be as little as one byte. Again, lower color depth beneficially reduces the power consumption and physical dimensions of the low power dedicated memory 112.

Figure 2:
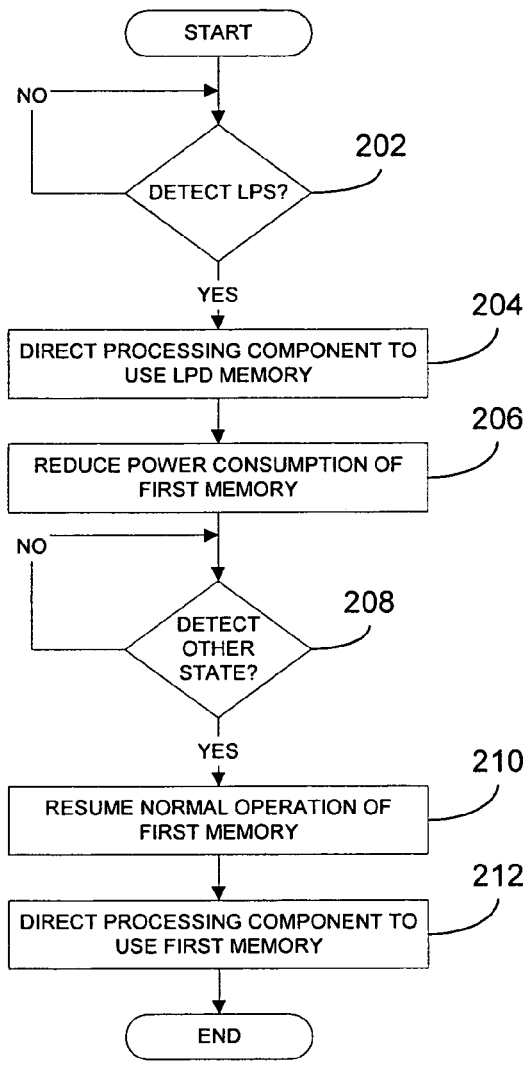
FIG. 2 is a flowchart illustrating processing in accordance with an embodiment of the present invention.

Referring now to FIG. 2, processing in accordance with the present invention is further described. In the presently preferred embodiment, the processing illustrated in FIG. 2 is carried out by a host processor (sometime referred to as an application processor in the field of graphics co-processors) using stored, executable instructions. However, it is possible that another processor, such as a graphics processing unit resident on a graphics co-processor could also be used to carry out the method of FIG. 2. Further still, hardware components such as state machines or other logic circuitry could also be used to carry out the processing of FIG. 2. Regardless, a continuous process of determining whether a low power state (LPS) has been detected occurs at block 202. As used herein, a low power state corresponds to an operating state for a device during which it is both possible and desirable to reduce the amount of power consumption. To this end, there may be many reasons why a low power state has been entered. For example, a user of a device may provide input to the device requesting entry into the low power state. Alternatively, a low power state may be automatically entered in those instances where no activity has been detected for a pre-determined period of time. For example, in the case of a wireless communication device such as a cellular telephone, such inactivity may be manifested by a lack of wireless transmitter or receiver activity, the lack of user input for a predetermined period of time, or even a lack of movement of the device.

Regardless, when a low power state has been detected, processing continues at block 204 where the processing component within the co-processor is directed to use the low power dedicated memory. In a presently preferred embodiment, this is accomplished by having the host processor modify one or more values in dedicated control registers residing on the co-processor. However, those having ordinary skill in the art will appreciate that other means for directing a processing component may be equally employed. At block 206, the power consumption of the first memory is reduced. In the presently preferred embodiment, this is accomplished by removing power entirely from the first memory 110. However, it may be possible to place the first memory in another low power state without entirely removing power.

At this point, the processing component continues to use the low power dedicated memory so long as the device remains in the low power state. During this time, it is constantly determined, at block 208, whether a power state other than the low power state, e.g., a normal power state, has occurred. For purposes of the present invention, a normal power state corresponds to any power state in which it is necessary or desirable to use the first memory in support of operations by the one or more processing components residing within the co-processor. Again, methods for determining when a normal power state arises are well known, including but not limited to receiving explicit user input or automatically detecting a sufficient level of activity. Regardless, if a state other than the low power state is detected at block 208, processing continues at block 210 wherein the first memory resumes normal operation, i.e., is fully powered. Thereafter, at block 212, the processing component is directed to use the first memory using the techniques described previously.

Figure 3:
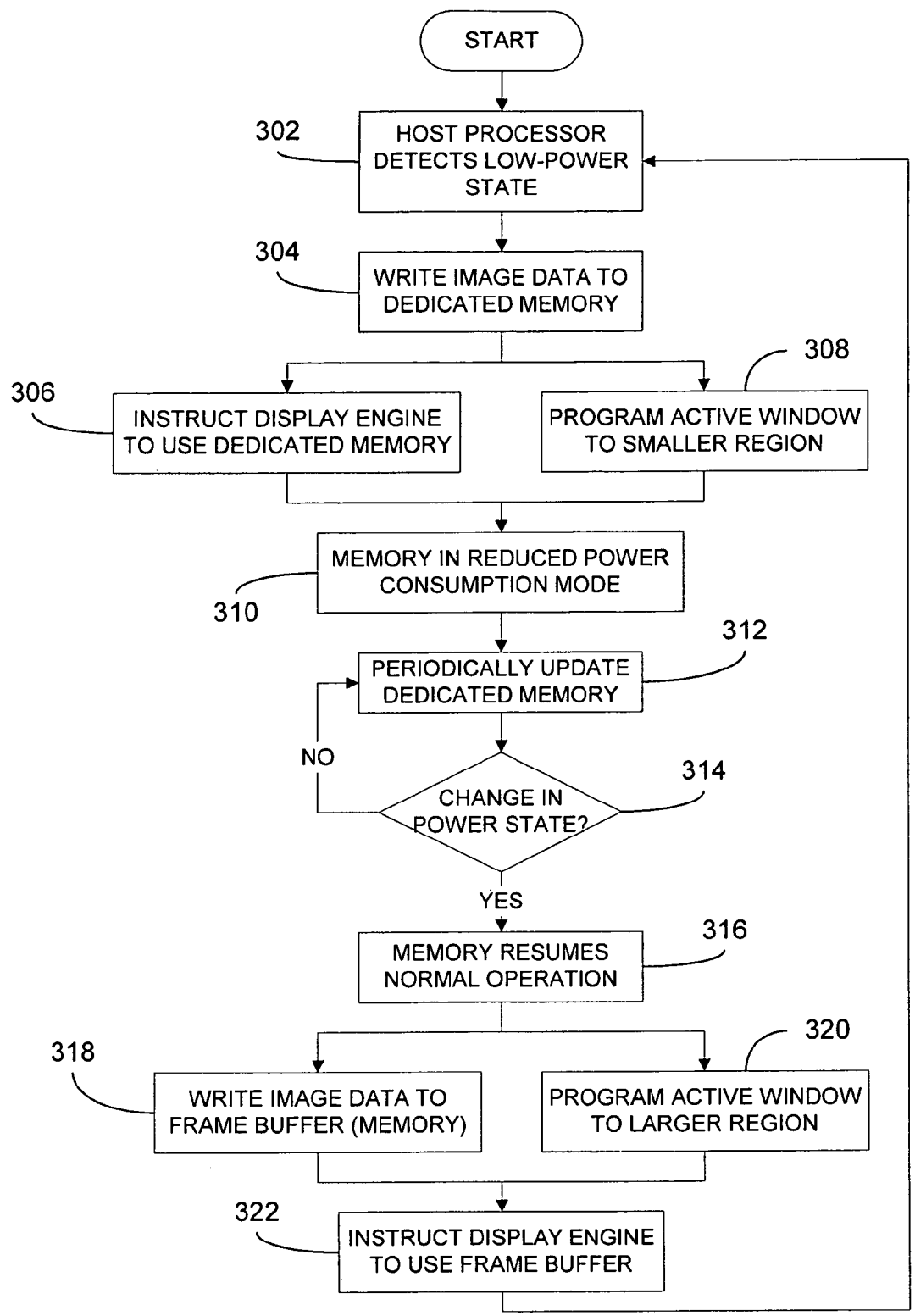
FIG. 3 is a flowchart illustrating more detailed processing in accordance with another embodiment of the present invention.

Referring now to FIG. 3, a more detailed description of processing in accordance with the present invention is provided. In particular, the processing illustrated in FIG. 3 is particularly applicable to a device in which a host processor communicates with a graphics co-processor, which in turn, renders images on a display. As before, the processing illustrated in FIG. 3 is preferably carried out by a host processor using stored, executable instructions. However, it is possible that another processor, such as a graphics processing unit resident on the graphics co-processor could also be used to carry out the method of FIG. 3. Regardless, beginning at block 302, the host processor detects a low power state and, in response, causes image data to be written into the low power dedicated memory at block 304. Of course, the host processor must also ensure that the low power dedicated memory is properly powered up (assuming that it is not provided power during operation other than the low power state) before writing (storing) anything to the low power dedicated memory. In a presently preferred embodiment, the low power dedicated memory is not provided power during operation other than the low power state, although this is not a requirement and the low power dedicated memory may be powered during other operating states. The above-described techniques for determining whether a low power state has been entered may be equally employed by the processing of FIG. 3. After detecting the low power state, processing continues at block 306 where the host processor instructs the display engine to use the low power dedicated memory, preferably using the above-described control registers. At block 308, although not necessarily in parallel as shown, the host processor also programs low power active window defining a smaller region for use by the display engine when rendering images on the display. Techniques for programming active windows are known to those having skill in the art. The use of active windows in accordance with the present invention may be further described with further reference to FIGS. 4 and 5.

Figure 4:
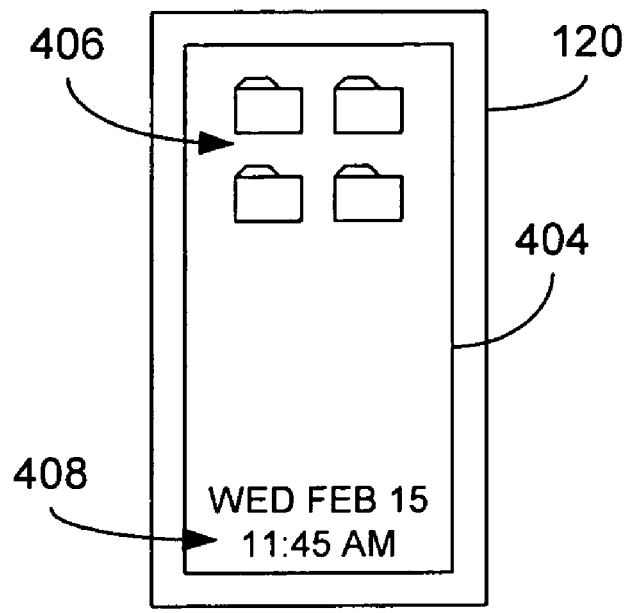
FIG. 4 is a schematic illustration of a display and a typical active window for a device in accordance with the present invention when operating in a state other than a low power state.

As shown in FIG. 4, during normal (i.e., not low power) operations, a display 120 typically includes an active window 404 that occupies substantially all of the available space within the display 120. Within the active window, various information may be included within the images displayed in the active window. For example, as shown, various icons or other visual elements 506 may be displayed in one region of the active window 504. In another region of the active window 504, other information, such as date and time information 508, may be also displayed. Note that certain information, such as the date and time information 508, may require periodic updates to reflect changes to the data. Another example of such information is a wireless signal strength indicator, the depiction of which may fluctuate as the device moves around and encounters varying coverage conditions.

Figure 5:
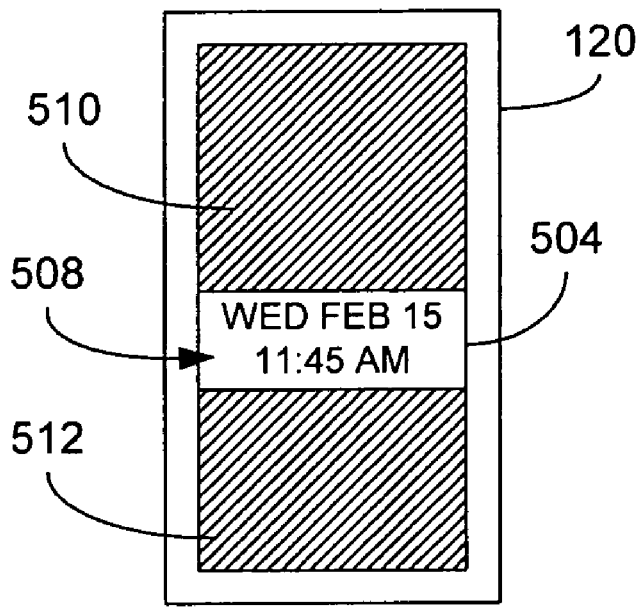
FIG. 5 is a schematic illustration of a display and low power active window for a device in accordance with the present invention when operating in a low power state.

In contrast, FIG. 5 illustrates a low power active window 504 that may be used in conjunction with the present invention during a low power state. As shown, the low power active window 504 has dimensions that are reduced in comparison with the normal active window 404. The other regions of the display 510, 512 not included within the low power active window 504 are not used to display images and, in the presently preferred embodiment, may be set to a programmable background color that does not require processing by the display engine. Alternatively, in those instances where the display 120 supports partial scanning, the unused regions 510, 512 of the display 120 can be unused entirely, i.e., not scanned, thereby further reducing power consumption. In the presently preferred embodiment, the image data to be displayed within the low power active window comprises information that needs to be periodically updated such as date and time information 508 as shown. Note that, because the image data 508 displayed in the low power active window 504 is stored in the low power dedicated memory, which preferably comprises a reduced color depth in comparison with the first memory, the number of colors that may be used to render the image data 508 may be less.

Referring once again to FIG. 3, processing continues at block 310 where the first memory is placed in a reduced power consumption mode, as previously described. Thereafter, the image data in the low power dedicated memory may be periodically updated at block 312 while it is continuously determined whether a change in power state has occurred at block 314. When a change in power state has been detected, i.e., a normal power consumption state as defined above has been entered, the process continues at block 316 where the first memory resumes normal operation. Subsequently, at block 318, image data is written to the frame buffer stored in the first memory in accordance with known techniques. In parallel, though not necessarily, an active window comprising a larger display region than the low power active window is programmed by the host processor at block 320. Thereafter, at block 322, the host processor instructs the display engine to use the frame buffer stored in the first memory in accordance with normal operating procedures until such time as the host processor once again determines that a low power state has been entered at block 302.

The present invention provides a technique for reducing power consumption in co-processors and, accordingly, in devices that incorporate such co-processors. By providing low power dedicated memory, preferably having storage capacity that is less then normal memory used within the co-processor, the present invention supports operation of co-processors in low power states. The resulting decrease in power consumption may be further supported by providing the low power dedicated memory with less color depth than normal memory, as well as through the use of low power active windows, as described above. In this manner, the present invention can beneficially extend battery life of portable devices while substantially overcoming the shortcomings of prior art techniques.

It is therefore contemplated that the present invention cover any and all modifications, variations or equivalents that fall within the spirit and scope of the basic underlying principles disclosed above and claimed herein.

What is claimed is:

1. In a device comprising a host processor operating in conjunction with a graphics processor that accesses a first memory device comprising a first frame buffer when in a state other than a low power state, a method for reducing power consumption of the graphics processor, the method comprising:
   detecting the low power state;
   responsive to detecting the low power state, reducing power consumption of the first memory device; and
   directing, in response to detection of the low power state, a display engine of the graphics processor to use a low power dedicated memory in which image data is periodically updated, wherein the dedicated memory comprises a second frame buffer, wherein the second frame buffer is smaller than the first frame buffer.

2. The method of claim 1, wherein detecting the low power state further comprises detecting inactivity of the device.

3. The method of claim 1, wherein detecting the low power state further comprises detecting a user request to enter the low power state.

4. The method of claim 1, further comprising:
   directing the display engine to render, within a display coupled to the graphics processor, a low power active window having dimensions smaller than an active window rendered by the display engine when in a state other than the low power state, wherein the image data is displayed in the low power active window.

5. The method of claim 4, further comprising:
   directing the display engine to display background color in those regions of the display other than the low power active window.

6. The method of claim 1, further comprising:
   detecting a state other than the low power state;
   resuming normal operation of the first memory in response to detection of the state other than the low power state; and
   directing the display engine to use the first memory in response to detection of the state other than low power state.

7. The method of claim 6, wherein detecting the state other than the low power state further comprises detecting activity of the device.

8. The method of claim 6, wherein detecting the state other than the low power state further comprises detecting a user request to enter the state other than the low power state.

9. A graphics processor capable of operating in cooperation with a host processor, the graphics processor comprising:
   a first memory comprising a first frame buffer;
   a display engine coupled to the first memory; and
   a low power dedicated memory comprising a second frame buffer coupled to the display engine, wherein the second frame buffer is smaller than the first frame buffer, wherein, when in a state other than a low power state, the display engine accesses the first memory, and wherein, when in the low power state, the first memory is in a reduced power consumption mode and the display engine uses the low power dedicated memory in which image data is periodically updated.

10. The graphics processor of claim 9, wherein the low power dedicated memory comprises static random access memory.

11. The graphics processor of claim 9, wherein the first memory is an embedded dynamic random access memory.

12. The graphics processor of claim 9, wherein a storage capacity of the low power dedicated memory is less than a storage capacity of the first memory.

13. The graphics processor of claim 9, wherein color depth of the low power dedicated memory is less than color depth of the first memory.

14. A device comprising:
    a display; and
    a graphics processor, in communication with the display, including a first memory comprising a first frame buffer, a display engine coupled to the first memory and a low power dedicated memory comprising a second frame buffer coupled to the display engine, wherein the second frame buffer is smaller than the first frame buffer, wherein, when in a state other than a low power state, the display engine accesses the first memory, and wherein, when in the low power state, the first memory is in a reduced power consumption mode and the display engine uses the low power dedicated memory in which image data is periodically updated.

15. The device of claim 14, wherein the low power dedicated memory comprises static random access memory.

16. The device of claim 14, wherein the first memory is an embedded dynamic random access memory.

17. The device of claim 14, wherein a storage capacity of the low power dedicated memory is less than a storage capacity of the first memory.

18. The device of claim 14, wherein color depth of the low power dedicated memory is less than color depth of the first memory.

19. The device of claim 14, further comprising a host processor in communication with the graphics processor that is configured to:
    detect the low power state; and
    direct the display engine to use the low power dedicated memory in response to detection of the low power state.

20. The device of claim 19, wherein the host processor is configured to detect the low power state by detecting inactivity of the device.

21. The device of claim 19, wherein the host processor is configured to detect the low power state by detecting a user request to enter the low power state.

22. The device of claim 19, wherein the host processor is further configured to:
    direct the display engine to render, within the display, a low power active window having dimensions smaller than an active window rendered by the display engine in a state other than the low power state.

23. The device of claim 22, wherein the host processor is further configured to:
    direct the display engine to display background color in those regions of the display other than the low power active window.

24. The device of claim 19, wherein the host processor is further configured to:
    detect a state other than the low power state;
    cause the first memory to resume normal operation in response to detection of the state other than the low power state; and
    direct the processing component to use the first memory in response to detection of the state other than low power state.

25. The device of claim 24, wherein the host processor is configured to detect the state other than the low power state by detecting activity of the device.

26. The device of claim 24, wherein the host processor is configured to detect the state other than the low power state by detecting a user request to enter the state other than the low power state.

27. In a device comprising a host processor operating in conjunction with a co-processor that accesses a first memory device comprising a first frame buffer when in a state other than a low power state, a method for reducing power consumption of the co-processor, the method comprising:
    detecting the low power state;
    responsive to detecting the low power state, reducing power consumption of the first memory device; and
    directing, in response to detection of the low power state, a processing component of the co-processor to use a low power dedicated memory in which image data is periodically updated, wherein the dedicated memory comprises a second frame buffer, wherein the second frame buffer is smaller than the first frame buffer.

28. A co-processor capable of operating in cooperation with a host processor, the co-processor comprising:
    a first memory comprising a first frame buffer;
    a processing component coupled to the first memory; and
    a low power dedicated memory comprising a second frame buffer coupled to the processing component, wherein the second frame buffer is smaller than the first frame buffer, wherein, when in a state other than a low power state, the processing component accesses the first memory, and wherein, when in the low power state, the first memory is in a reduced power consumption mode and the processing component uses the low power dedicated memory in which image data is periodically updated.

* * * * *